US012228957B2

(12) United States Patent
Kimura

(10) Patent No.: US 12,228,957 B2
(45) Date of Patent: Feb. 18, 2025

(54) OUTPUT DETECTION CIRCUIT

(71) Applicant: WILL SEMICONDUCTOR (SHANGHAI) CO. LTD., Shanghai (CN)

(72) Inventor: Hiroyuki Kimura, Miyagi (JP)

(73) Assignee: WILL SEMICONDUCTOR (SHANGHAI) CO. LTD., Shanghai (CN)

( * ) Notice: Subject to any disclaimer, the term of this patent is extended or adjusted under 35 U.S.C. 154(b) by 242 days.

(21) Appl. No.: 18/155,490

(22) Filed: Jan. 17, 2023

(65) Prior Publication Data

US 2024/0201724 A1 Jun. 20, 2024

(30) Foreign Application Priority Data

Dec. 14, 2022 (CN) ......................... 202211607770.3

(51) Int. Cl.
*G05F 3/26* (2006.01)
*G05F 1/46* (2006.01)

(52) U.S. Cl.
CPC .............. *G05F 3/262* (2013.01); *G05F 1/461* (2013.01)

(58) Field of Classification Search
CPC ... G05F 3/262; G05F 3/26; G05F 3/16; G05F 3/02; G05F 3/08; G05F 1/461;
(Continued)

(56) References Cited

U.S. PATENT DOCUMENTS

2014/0293714 A1* 10/2014 Dayley .................. G11C 5/147 323/314
2015/0338872 A1* 11/2015 Afzal ......................... G05F 3/02 323/313
2016/0139620 A1* 5/2016 Landolt ..................... G05F 3/24 327/108

OTHER PUBLICATIONS

"AND8093/D, Current Sensing Power MOSFETs," ON Semiconductor, March 2107, Rev. 6, pp. 1-11, 13 pages.
(Continued)

*Primary Examiner* — Nguyen Tran
(74) *Attorney, Agent, or Firm* — MUNCY, GEISSLER, OLDS & LOWE, P.C.

(57) ABSTRACT

The disclosure: a positive mirror FET, through which a positive mirror current that is proportional to a positive-direction current in currents of an output FET in positive and negative directions is made to flow; a first operational amplifier, receiving a constant voltage at one end, receiving an upstream side voltage regarding the positive mirror current of the positive mirror FET at the other end, and outputting a voltage corresponding to the upstream side voltage regarding the positive mirror current of the positive mirror FET by converting an output voltage into a current and feeding back the current to the other end; a negative mirror FET, through which a negative mirror current that is proportional to a negative-direction current in the currents of the output FET in positive and negative directions is made to flow; and a second operational amplifier, receiving a constant voltage at one end, receiving an upstream side voltage regarding the negative mirror current of the negative mirror FET at the other end, and outputting a voltage corresponding to the upstream side voltage regarding the negative mirror current of the negative mirror FET by converting an output voltage into a current and feeding back the current to the other end. A detection value is output based on an output current obtained by adding a positive output
(Continued)

current corresponding to the output of the first operational amplifier and a negative output current corresponding to the output of the second operational amplifier.

2 Claims, 4 Drawing Sheets

(58) Field of Classification Search
CPC .......... G05F 1/465; G05F 1/573; G05F 1/575; G05F 1/585; G05F 1/46; G05F 1/44; G05F 1/10; G05F 1/08
See application file for complete search history.

(56) References Cited

OTHER PUBLICATIONS

"MP6540, MP6540A, 35V, 3A, Three-Phase Power Stage," MPS, Nov. 29, 2018, pp. 1-14, 14 pages.

* cited by examiner

OUTPUT DETECTION CIRCUIT

BACKGROUND OF THE INVENTION

1. Field of the Invention

The disclosure relates to a current detection circuit for output field effect transistor (FET) that outputs currents in positive and negative directions.

2. Description of the Related Art

Conventionally, in a case of performing pulse width modulation (PWM) control on a load, a drive current to the load is detected for current control of the load. Current detection can be performed by providing a current detection resistor in series with the load and measuring a voltage drop caused by the current detection resistor. However, in this case, the power consumption caused by the detection resistor becomes power loss.

An application is also known in which current detection is performed by using an ON resistance of an output transistor controlling power supply to a load. According to this, the excess power loss can be eliminated. Here, because the ON resistance of the output transistor has a large temperature dependence, another reference transistor is used to compensate for the temperature dependence.

Here, in a case that the current to the load is not in either one direction but in both positive and negative directions, a negative-voltage power source is required to detect a negative-direction current. However, in a general circuit, no negative-voltage power source is provided, and it is not efficient to provide a negative-voltage power source for current detection.

SUMMARY OF THE INVENTION

An output current detection circuit related to the disclosure,

- which is an output current detection circuit for an output FET that outputs currents in positive and negative directions,
- a positive mirror FET, through which a positive mirror current that is proportional to a positive-direction current in the currents of the output FET in positive and negative directions is made to flow;
- a first operational amplifier, receiving a constant voltage at one end, receiving an upstream side voltage regarding the positive mirror current of the positive mirror FET at the other end, and outputting a voltage corresponding to the upstream side voltage regarding the positive mirror current of the positive mirror FET by converting an output voltage into a current and feeding back the current to the other end;
- a negative mirror FET, through which a negative mirror current that is proportional to a negative-direction current in the currents of the output FET in positive and negative directions is made to flow; and
- a second operational amplifier, receiving a constant voltage at one end, receiving an upstream side voltage regarding the negative mirror current of the negative mirror FET at the other end, and outputting a voltage corresponding to the upstream side voltage regarding the negative mirror current of the negative mirror FET by converting an output voltage into a current and feeding back the current to the other end, wherein

- a detection value is output based on an output current obtained by adding a positive output current corresponding to the output of the first operational amplifier and a negative output current corresponding to the output of the second operational amplifier.

According to the output current detection circuit related to the disclosure, the output currents in both positive and negative directions can be detected without using a negative power source.

PREFERRED EMBODIMENT OF THE PRESENT INVENTION

Hereinafter, embodiments of the disclosure are described with reference to the drawings. Note that, the following embodiments do not limit the scope of the disclosure, and configurations obtained by selectively combining multiple examples are also included in the disclosure.

"Overall Configuration"

Figure 1:
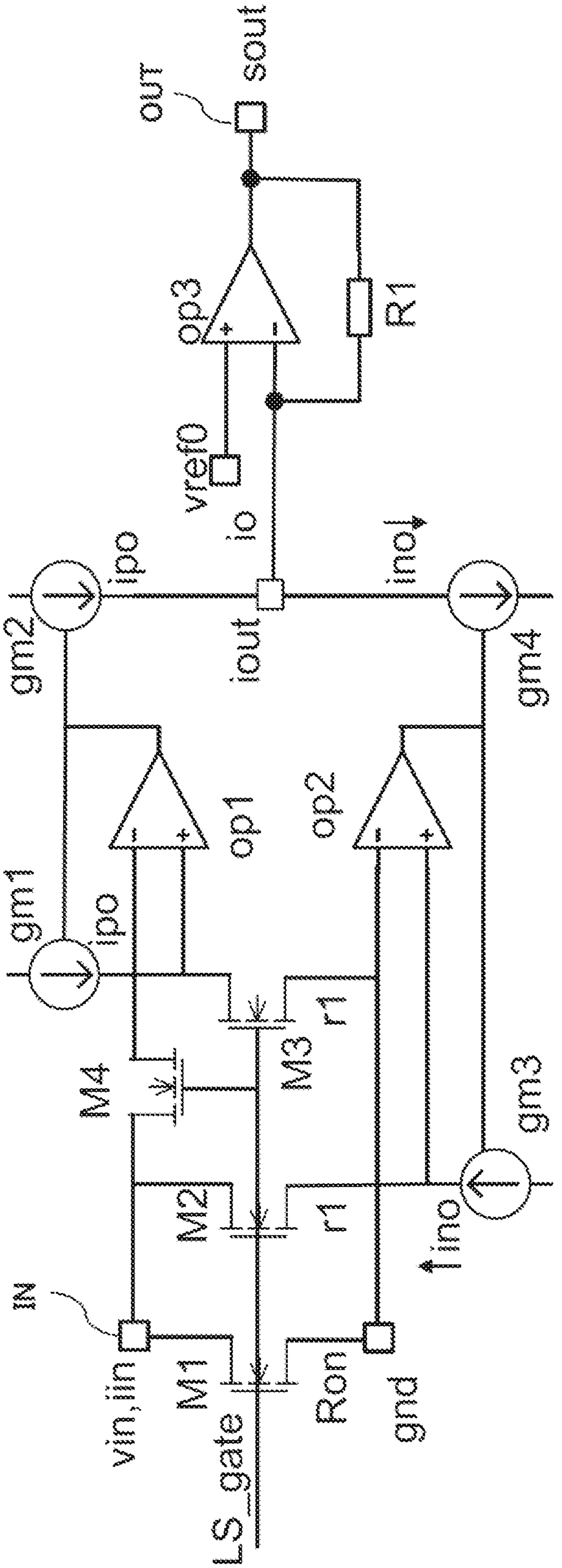
FIG. 1 is a circuit diagram showing an output detection circuit according to an embodiment.

FIG. 1 is a diagram showing a circuit of an output detection circuit according to an embodiment. Here, in the circuit according to the embodiment, a metal-oxide-semiconductor field-effect transistor (MOSFET) is used as a transistor.

In an N-type transistor M1, the drain is connected to an input end IN, the source is connected to ground gnd, and a signal LS_gate is supplied to the gate. A load to be driven is connected to the input end IN, and a current iin flowing through the load is supplied to the input end IN. Therefore, the current iin flows from the input end IN toward the ground gnd via the transistor M1. The transistor M1 is referred to as the output FET.

The current iin is an output current to be detected, and changes from a positive-direction current to a negative-direction current. In addition, a resistance when the transistor M1 is ON, that is, an ON resistance, is represented by Ron. Therefore, a voltage vin of the input end IN is expressed by vin=Ron*in.

The gate of an N-type transistor M2 is commonly connected to the gate of the transistor M1. The drain of the transistor M2 is connected to the input end IN. A current source gm3 is connected to the source of the transistor M2. The current source gm3 makes a current flow toward the input end IN. Therefore, the transistor M2 makes the current flow from the source thereof toward the drain. The current source gm3 can be constituted by a transistor through which a current from a power source is made to flow. The transistor M2 makes a mirror current corresponding to a negative-direction current of the transistor M1 flow, and thus the transistor M2 is referred to as the negative mirror FET.

A connection point between the source of the transistor M2 and the current source gm3 is connected to a positive input end of an operational amplifier op2. That is, an upstream side voltage of the transistor M2 is supplied to the positive input end of the operational amplifier op2. A negative input end of the operational amplifier op2 is connected to the ground. That is, a source side voltage of the transistor M1 is supplied to the negative input end of the operational amplifier op2. An output end of the operational amplifier op2 is connected to a control end of the current source gm3. An output voltage of the operational amplifier op2 is converted into a current by the current source gm3. The operational amplifier op2 is referred to as the second operational amplifier.

The operational amplifier op2 operates in a manner that the source of the transistor M2 becomes the ground gnd. Therefore, the transistor M2 makes a current having the same current density as the transistor M1 (a current corresponding to an area ratio with the transistor M1) flow. When an ON resistance of the transistor M2 is set to r1 and the current flowing through the transistor M2 is set to ino, the voltage vin of the input end IN is expressed by vin=r1*ino.

The gate of an N-type transistor M3 is also commonly connected to the gate of the transistor M1. A current source gm1 is connected to the drain of the transistor M3. The source of the transistor M3 is connected to the ground gnd. The current source gm1 makes a current flow toward the ground gnd. Therefore, the transistor M3 makes the current flow from the drain toward the source. The current source gm1 can be constituted by a transistor through which a current from the power source is made to flow. The transistor M3 makes a mirror current corresponding to a positive-direction current of the transistor M1 flow, and thus the transistor M3 is referred to as the positive mirror FET.

A connection point between the drain of the transistor M3 and the current source gm1 is connected to a positive input end of an operational amplifier opt. That is, an upstream side voltage of the transistor M3 is supplied to the positive input end of the operational amplifier op1. A negative input end of the operational amplifier op1 is connected to the input end IN via an N-type transistor M4. That is, a drain side voltage of the transistor Mt is supplied to the negative input end of the operational amplifier op1. In addition, the gate of the transistor M4 is commonly connected to the gates of the transistors M1, M2, and M3. The operational amplifier op1 is referred to as the first operational amplifier.

Besides, an output end of the operational amplifier opt is connected to a control end of the current source gm1.

Here, the current source gm1 makes the current flow toward the ground gnd, and in a case that the current in at the input end IN flows out from the input end IN toward the load side, that is, in a negative direction, no current flows through the transistor M3. The gate of the transistor M4 is connected to the LS_gate similarly to the gate of the transistor M1, and is ON when the transistor Mt is ON and is OFF when the transistor Mt is OFF. The transistor M4 is not necessary when the operational amplifier op1 is an ideal circuit. However, when the transistor M1 is OFF, the voltage vin may be at a high potential, and in this case, the transistor M4 is turned off, thereby preventing the input of the operational amplifier op1 from reaching a high potential, and preventing the operational amplifier op1 from being destroyed.

In a case that the current in at the input end IN flows into the input end IN toward the load side, that is, in a positive direction, the operational amplifier opt operates in a manner that the positive input end is at the same voltage as the input end IN, and a current having the same current density as the transistor M1 (a current corresponding to an area ratio with the transistor M1) flows through the transistor M3.

When an ON resistance of the transistor M3 is set to r1 and the current flowing through the transistor M3 is set to ipo, the voltage at the positive input end of the operational amplifier opt is expressed by r1*ipo, and the operational amplifier opt operates in a manner that the voltage vin of the input end IN becomes r1*ipo.

In this way, a current that is proportional to the negative current in flowing through the transistor M1 flows through the transistor M2, and a current that is proportional to the positive current in flowing through the transistor M1 flows through the transistor M3.

The control end of the current source gm3 and a control end of a current source gm4 are connected to the output end of the operational amplifier op2. The current source gm4 makes a current which is the same as that of the current source gm3 but in an opposite direction flow. For example, the current source gm4 may be formed by the same transistor as that of the current source gm3, the same current as that of the current source gm3 may be generated in the current source gm4, and an inversion circuit may be used for the generated current to reverse a current direction. As the inversion circuit, various types of circuits can be used.

The control end of the current source gm1 and a control end of a current source gm2 are connected to the output end of the operational amplifier op1. The current source gm2 makes the same current as that of the current source gm1 flow. For example, the current source gm1 and the current source gm2 can be constituted by a current mirror. The output voltage of the operational amplifier op2 is converted into a current by the current sources gm1 and gm2.

A connection point between the current source gm2 and the current source gm4 is a current output end iout. As described above, the current source gm2 makes the positive output current ipo flow, and the current source gm4 makes the negative output current ino flow, and thus the current ipo flows out of the current output end iout and the current ino is drawn in from the current output end.

A negative input end of an operational amplifier op3 is connected to the current output end iout. A reference voltage vref0 is supplied to a positive input end of the operational amplifier op3, an output end of the operational amplifier op3 is connected to an output end sout, and feedback is performed to the negative input end via a resistor R1. Therefore, the output end sout is at a voltage that fluctuates within voltages of io*R1 by using the reference voltage vref0 as a reference. Therefore, an output proportional to the current iin in both positive and negative directions is obtained as a detection value. The operational amplifier op3 is referred to as the third operational amplifier.

Figure 2:
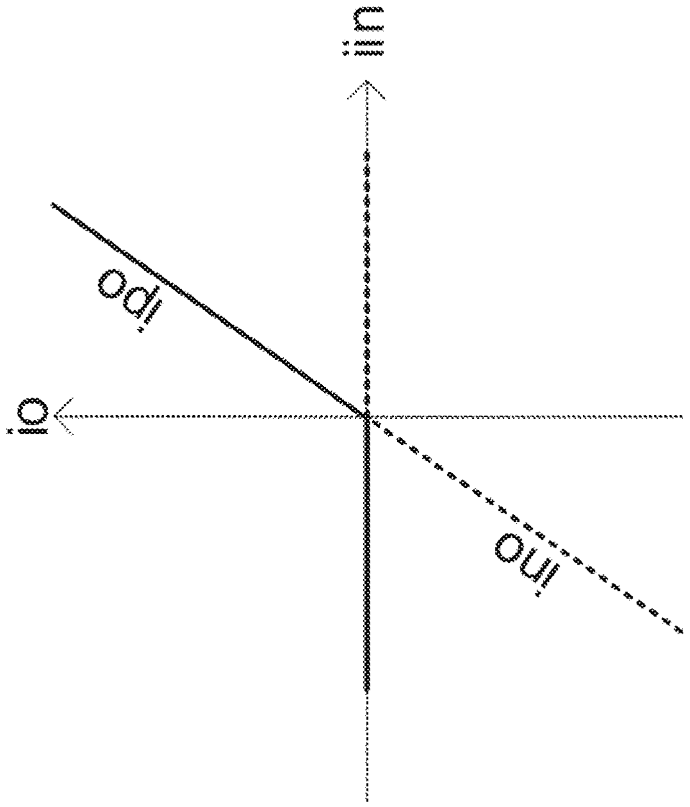
FIG. 2 is a diagram showing an output current io from a current output end Iout of an output detection circuit according to an embodiment.

FIG. 2 is a diagram showing an output current io from the current output end Iout. In this way, the current ipo is 0 when the current iin is negative, and increases according to the current iin when the current iin is positive. Regarding the current ino, the negative current negatively increases when the current iin is negative, and the current ino becomes 0 when the current iin is positive. Therefore, regarding the output current io, the current ino is output when the current iin is negative and the current ipo is output when the current iin is positive. Therefore, the output current io changes according to the current iin regardless of whether the current iin is positive or negative.

"Variation Configuration"

Figure 3:
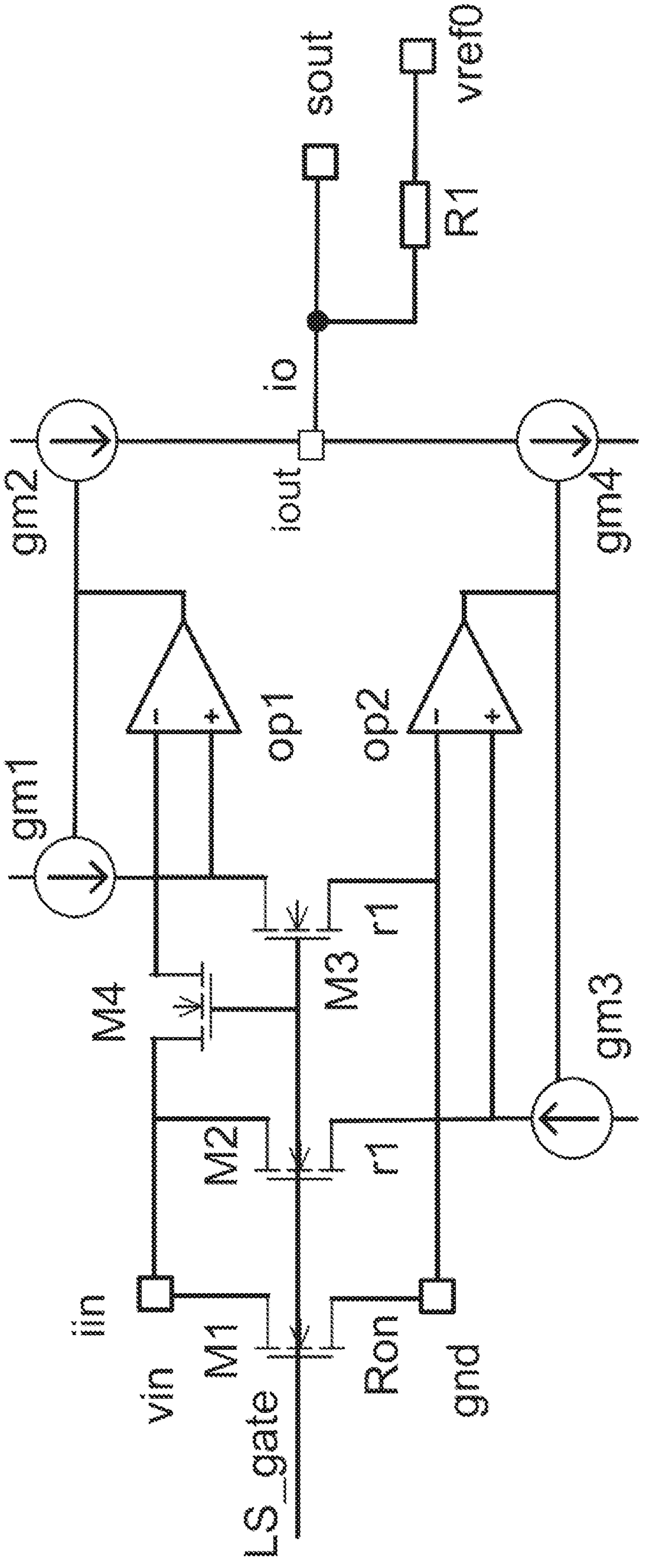
FIG. 3 is a circuit diagram showing a configuration of a variation example of an output detection circuit according to an embodiment.

FIG. 3 is a circuit diagram showing a configuration of a variation example. The operational amplifier op3 in FIG. 1 is omitted, the output end sout is directly connected to the current output end iout, and is connected, via the resistor R1, to a reference voltage source outputting the reference voltage vref0. By setting the resistor R1 to have a relatively large resistance, the current flowing through the resistor R1 can be reduced, and the center voltage of the output end sout can be set to the reference voltage vref0. That is, the output end sout outputs the current io with the reference voltage vref0 as a center.

Figure 5:
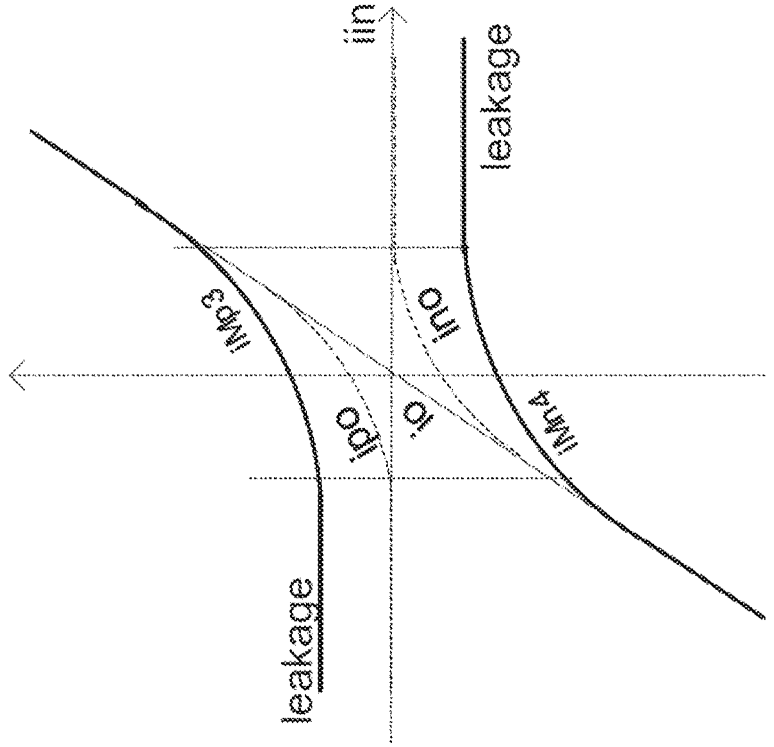
FIG. 5 is a diagram showing the state of currents ipo and ino near the 0 point.
Figure 4:
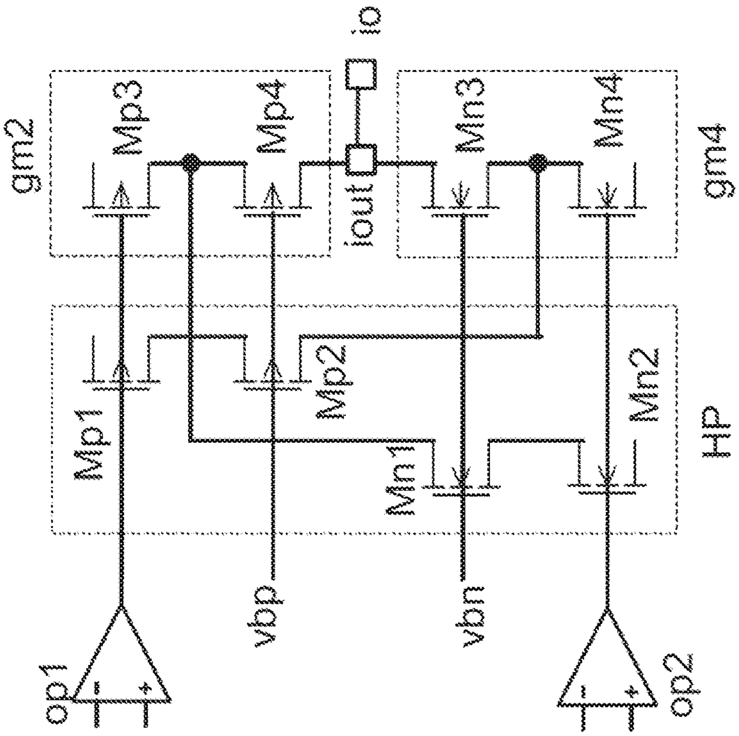
FIG. 4 is a circuit diagram showing a configuration in which the linearity near a connection point between currents ipo and ino of an output detection circuit according to an embodiment is improved.

FIG. 4 shows a configuration in which the linearity near a connection point between currents ipo and ino is improved. FIG. 5 is a diagram showing the state of currents ipo and ino near the 0 point.

In the foregoing example, the current source gm2 is constituted by a transistor Mp3, and the current source gm4 is constituted by a transistor Mn4. In this case, in the diagram, a leakage current as represented by IMp3 and IMn4 is generated in the transistors Mp3 and Mn4. That is, the transistor cannot be completely turned off, and some amount of current flows even when the transistor is turned off.

In the example shown in FIG. 4, a transistor Mp4 is arranged between the transistor Mp3 and the current output end iout, and a transistor Mn3 is arranged between the transistor Mn4 and the current output end iout.

In addition, a help circuit HP is interposed between the operational amplifier opt, the operational amplifier op2, and the current sources gm2 and gm4.

The gate of a P-type transistor Mp1 is connected to the gate of the P-type transistor Mp3. The source of the transistor Mp1 may be connected to the same power source (at a high voltage) as the transistor Mp3. The drain of the transistor Mp1 is connected to the source of the P-type transistor Mp2, and the drain of the transistor Mp2 is connected to a connection point between the transistor Mn3 and the transistor Mn4.

The gate of an N-type transistor Mn2 is connected to the gate of the N-type transistor Mn4. The source of the transistor Mn2 may be connected to the same power source (at a low voltage) as the transistor Mn4. The drain of the transistor Mn2 is connected to the source of the transistor Mn1, and the drain of the transistor Mn2 is connected to a connection point between the transistor Mp3 and the transistor Mp4.

In this configuration, when the current in is positive, the amount of leakage current of the transistor Mn4 is supplied via the transistors Mp1 and Mp2. On the other hand, when the current in is negative, the leakage current of the transistor Mp3 is drawn out via the transistors Mn1 and Mn2.

Moreover, the gates of the transistors Mp2 and Mp4 are connected to a power source vbp, and the transistors Mp2 and Mp4 are turned on when the current in is positive. The gates of the transistors Mn1 and Mn3 are connected to a power source vbn, and are turned on when the current in is negative.

By the circuit shown in FIG. 4, the leakage current of the transistors Mp3 and Mn4 is compensated, and then the linearity of the output current can be improved.

What is claimed is:

1. An output current detection circuit for an output FET that outputs currents in positive and negative directions, the output current detection circuit:

a positive mirror FET, through which a positive mirror current that is proportional to a positive-direction current in the currents of the output FET in positive and negative directions is made to flow;

a first operational amplifier, receiving a constant voltage at one end, receiving an upstream side voltage regarding the positive mirror current of the positive mirror FET at the other end, and outputting a voltage corresponding to the upstream side voltage regarding the positive mirror current of the positive mirror FET by converting an output voltage into a current and feeding back the current to the other end;

a negative mirror FET, through which a negative mirror current that is proportional to a negative-direction current in the currents of the output FET in positive and negative directions is made to flow; and a second operational amplifier, receiving a constant voltage at one end, receiving an upstream side voltage regarding the negative mirror current of the negative mirror FET at the other end, and outputting a voltage corresponding to the upstream side voltage regarding the negative mirror current of the negative mirror FET by converting an output voltage into a current and feeding back the current to the other end, wherein a detection value is output based on an output current obtained by adding a positive output current corresponding to the output of the first operational amplifier and a negative output current corresponding to the output of the second operational amplifier.

2. The output current detection circuit according to claim 1, comprising:

a third operational amplifier, converting the output current into a voltage with a reference voltage as a center, wherein a detection value is output from the third operational amplifier.

* * * * *